Jan. 17, 1933.  P. T. ROBIN  1,894,633
VEHICLE
Filed March 31, 1930
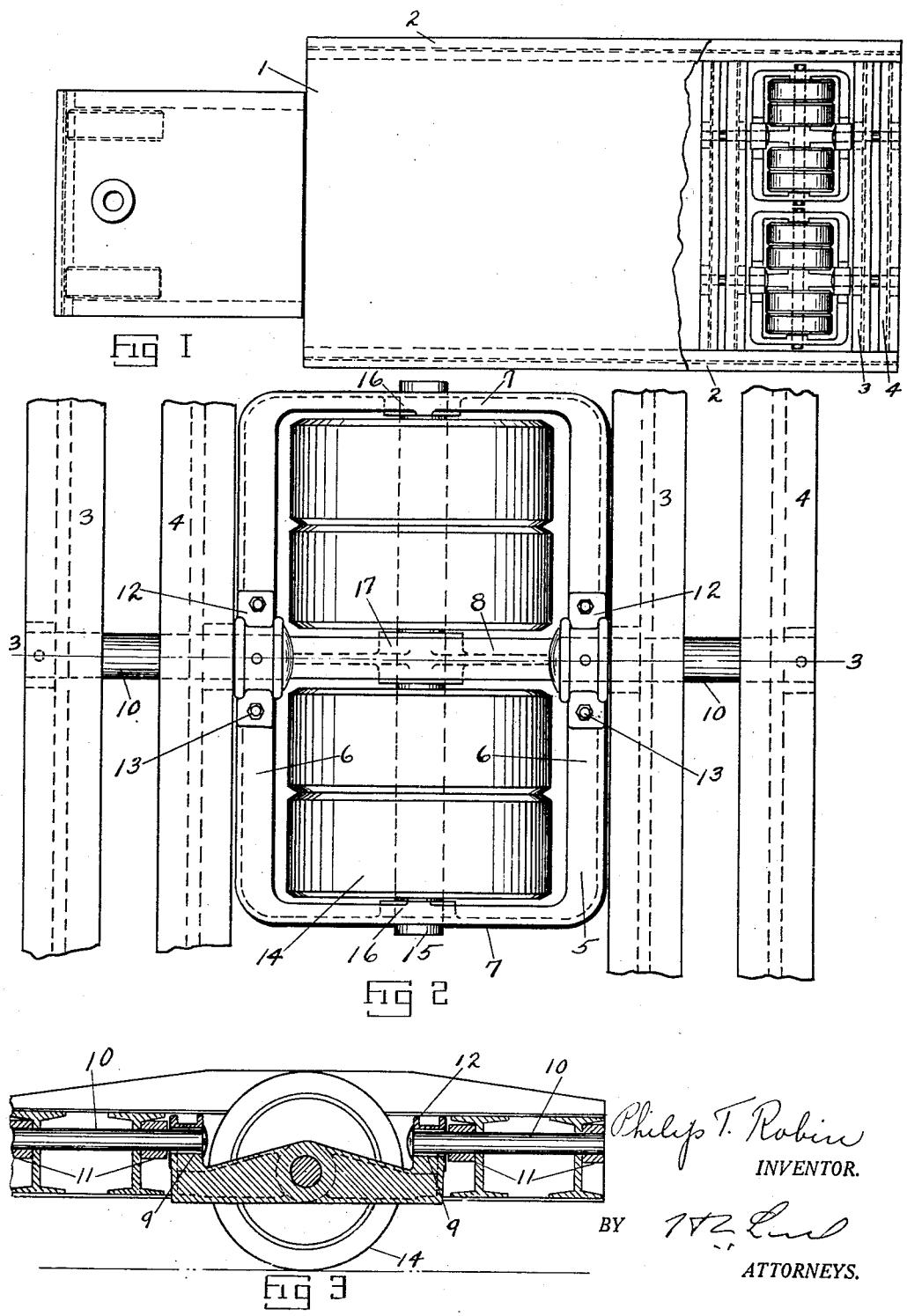

Patented Jan. 17, 1933

1,894,633

UNITED STATES PATENT OFFICE

PHILIP T. ROBIN, OF ERIE, PENNSYLVANIA, ASSIGNOR, BY MESNE ASSIGNMENTS, TO THE WELLMAN ENGINEERING COMPANY, OF CLEVELAND, OHIO, A CORPORATION OF OHIO

VEHICLE

Application filed March 31, 1930. Serial No. 440,256.

In vehicles, such as trailers, it has been found desirable, particularly where there are a plurality of sets of wheels, to arrange the sets so that they can swing on a fore and aft axis so that the wheels may more readily conform to the road and each wheel at all times carry its proportion of the weight. With such an apparatus it is very often desirable to remove the wheel assembly as a wheel from the body. It will be understood that such trailers are often very heavy so that the removal of the parts can only be done with some power apparatus. The present invention is designed to permit of the separation of the body from the wheel assemblies by the mere lifting of the body, or dropping of the assemblies from the body with the body held stationary. Features and details of the invention will appear from the specification and claims.

A preferred embodiment of the invention is illustrated in the accompanying drawing as follows:—

Fig. 1 shows a plan view of a trailer.

Fig. 2 an enlarged view of one of the wheel assemblies.

Fig. 3 a reduced section on the line 3—3 in Fig. 2.

1 marks the trailer body. This has the side members 2 and cross members 3 and 4. Wheel supports 5 are preferably of box frame formation having the front and rear sides 6, the end sides 7 with a center member 8.

Bearings 9 having a front to rear axis are arranged on the centers of the sides 6. These bearings are adapted to receive the ends of bearing shafts 10. These shafts extend through the cross members 3 and 4 and blocks 11 secured to these cross members. The weight of the frame is transmitted through the shaft 10 and the bearings 9 to the frame 5. A removable cap 12 extends from the shaft 10 and is secured to the frame by bolts 13.

Wheels 14 are arranged at each side of the frame and are carried on an axle 15, the axle extending through bearing openings 16 in the end members 7 and bearing openings 17 in the center member 8.

As shown there are a plurality of the wheel assemblies involving the frame 5 making four wheel members at the rear of the trailer. It will readily be seen that these pairs of wheels swivel on the shafts 10 and are thus free to follow the road surface.

When it is desired to remove the wheel assemblies the bolts 13 may be loosened, the caps 12 removed, and then the frame jacked up. This, without any further effort on the part of the operator, releases the wheel assembly so that it may be repaired, or serviced, as desired.

What I claim as new is:—

1. In a vehicle, the combination of a frame having cross members; a wheel support; a pivotal connection between the cross members and the wheel support comprising fore and aft extending bearing shafts; bearing boxes on the shafts, said bearing boxes comprising a separable cap, the removal of which permitting the separation of the wheel support from the frame by a vertical movement of the support and frame; and wheels mounted on the support.

2. In a vehicle, the combination of a frame; wheel supports arranged in alinement transversely of the frame; wheels arranged each side of the center of each support; and pivotal connections between the frame and the wheel supports, said pivotal connections being separable transversely to the axis of the connections, said separation permitting the lifting of the frame from the supports and permitting the removal bodily of the supports and wheels from the vehicle.

In testimony whereof I have hereunto set my hand.

PHILIP T. ROBIN.